(12) United States Patent
Yang

(10) Patent No.: US 6,322,134 B1
(45) Date of Patent: Nov. 27, 2001

(54) FRONT FRAME REINFORCEMENT STRUCTURE OF VEHICLE

(75) Inventor: Chul-ho Yang, Kyunggi-do (KR)

(73) Assignee: Kia Motors Corporation, Seoul (KR)

( * ) Notice: Subject to any disclaimer, the term of this patent is extended or adjusted under 35 U.S.C. 154(b) by 0 days.

(21) Appl. No.: 09/711,398

(22) Filed: Nov. 13, 2000

(30) Foreign Application Priority Data

Sep. 4, 2000 (KR) .................................................. 00-52034

(51) Int. Cl.[7] ...................................................... B60J 7/00
(52) U.S. Cl. ................................ 296/203.02; 296/203.03; 296/203.01; 296/188; 296/194
(58) Field of Search ......................... 296/203.02, 203.03, 296/203.01, 188, 194, 192, 29

(56) References Cited

U.S. PATENT DOCUMENTS

| | | | |
|---|---|---|---|
| 4,682,812 | * | 7/1987 | Hurten et al. ............................ 296/188 |
| 4,699,419 | * | 10/1987 | Kawase et al. .......................... 296/188 |
| 4,747,636 | * | 5/1988 | Harasaki et al. ........................ 296/203 |
| 4,789,198 | * | 12/1988 | Ide ............................................. 296/188 |
| 4,807,925 | * | 2/1989 | Sakamoto et al. ..................... 296/203 |
| 4,950,024 | * | 8/1990 | Watari et al. ........................... 296/194 |
| 5,042,872 | * | 8/1991 | Yoshii ..................................... 296/203 |
| 5,052,742 | * | 10/1991 | Akoshima et al. ..................... 296/294 |
| 5,061,009 | * | 10/1991 | Harasaki et al. ....................... 296/194 |
| 5,106,148 | * | 4/1992 | Ikeda et al. ............................. 296/203 |
| 5,201,566 | * | 4/1993 | Mori ........................................ 296/203 |
| 5,246,264 | * | 9/1993 | Yoshii ..................................... 296/203 |
| 5,653,495 | * | 8/1997 | Bovellan et al. ....................... 296/188 |
| 5,860,694 | * | 1/1999 | Seefried et al. ........................ 296/203.03 |
| 6,053,564 | * | 4/2000 | Kamata et al. ......................... 296/188 |
| 6,073,992 | * | 6/2000 | Yamauchi et al. ..................... 296/203.01 |
| 6,135,542 | * | 10/2000 | Emmelmann et al. .............. 296/203.01 |
| 6,217,109 | * | 4/2001 | Okana et al. .......................... 296/203.03 |

* cited by examiner

Primary Examiner—Joseph D. Pape
Assistant Examiner—Kiran B. Patel
(74) Attorney, Agent, or Firm—Davis & Bujold, P.L.L.C.

(57) ABSTRACT

Disclosed is a front frame reinforcement structure of a vehicle including a front column including an inner panel and an outer panel coupled to each other to form a closed structure, a side frame welded at one end thereof to one end of the front column, a reinforcement panel welded at one end thereof to the one end of the front column, the reinforcement panel being welded at the other end thereof to the other end of the side frame so that it defines a closed structure enclosing the front column, together with the side frame, and a dash panel welded at one end thereof to the other end of the reinforcement panel. This front frame reinforcement structure provides an enhancement in the bending and torsion rigidity of a vehicle body, thereby being capable of suppressing an injure of occupants when impact is applied to the front part of the vehicle due to a collision accident.

1 Claim, 2 Drawing Sheets

FRONT FRAME REINFORCEMENT STRUCTURE OF VEHICLE

BACKGROUND OF THE INVENTION

1. Field of the Invention

The present invention relates to a front frame reinforcement structure of a vehicle, and more particularly to a front frame reinforcement structure of a vehicle, which includes a front column, a side frame, and a dash panel having an enhanced coupling rigidity, thereby being capable of providing an improved safety for occupants even when impact is applied to the front portion of the vehicle during a running of the vehicle.

2. Description of the Related Art

A front column is installed at the front portion of a vehicle. As shown in FIGS. 1 and 2, such a front column, which is denoted by the reference numeral 20, includes an inner panel 21 and an outer panel 22 coupled to each other in such a fashion that they form a closed cross-sectional structure. A side frame 30 is coupled to an outer surface of the outer panel 22 included in the front column 20. The side frame 20 is welded to one end of a dash panel 10 at one end thereof.

In such a construction in which the side frame 30 coupled at its one surface to the outer surface of the outer panel 22 included in the front column 20 forming the front part of a vehicle is welded only to an end of the dash panel 10 at one end thereof, however, the coupling portion of the side frame 30 may be easily damaged when impact of a certain level or more is applied to the front part of the vehicle due to a collision accident generated during a running of the vehicle. Furthermore, the side frame 30, dash panel 10, and front column 20 damaged due to the impact may be penetrated into the interior of the vehicle, thereby causing the occupants to be injured.

SUMMARY OF THE INVENTION

Therefore, an object of the invention is to solve the above mentioned problems, and to provide a front frame reinforcement structure of a vehicle which is capable of absorbing impact energy applied to a side panel in a sequential fashion when impact is applied to the front part of the vehicle due to a collision accident, thereby suppressing a penetration of the side panel to achieve an improvement in the safety of occupants.

In accordance with the present invention, this object is accomplished by providing a front frame reinforcement structure of a vehicle comprising: a front column including an inner panel and an outer panel coupled to each other to form a closed structure; a side frame welded at one end thereof to one end of the front column; a reinforcement panel welded at one end thereof to the one end of the front column, the reinforcement panel being welded at the other end thereof to the other end of the side frame so that it defines a closed structure enclosing the front column, together with the side frame; and a dash panel welded at one end thereof to the other end of the reinforcement panel.

BRIEF DESCRIPTION OF THE DRAWINGS

The above objects, and other features and advantages of the present invention will become more apparent after a reading of the following detailed description when taken in conjunction with the drawings, in which.

DESCRIPTION OF THE PREFERRED EMBODIMENTS

Now, preferred embodiments of the present invention will be described in detail, with reference to the annexed drawings.

Figure 1:
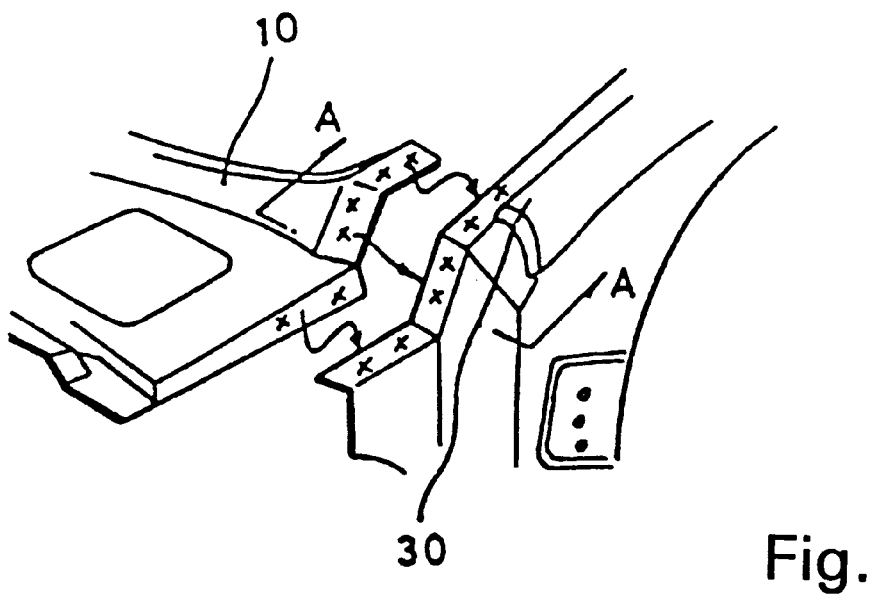
FIG. 1 is an exploded perspective view illustrating the front part of a vehicle including a conventional front frame.
Figure 2:
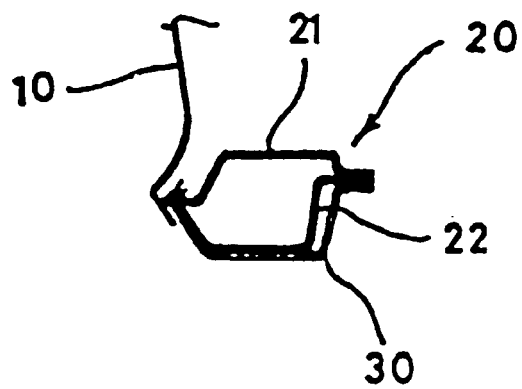
FIG. 2 is a cross-sectional view taken along the line A—A of FIG. 1.
Figure 3:
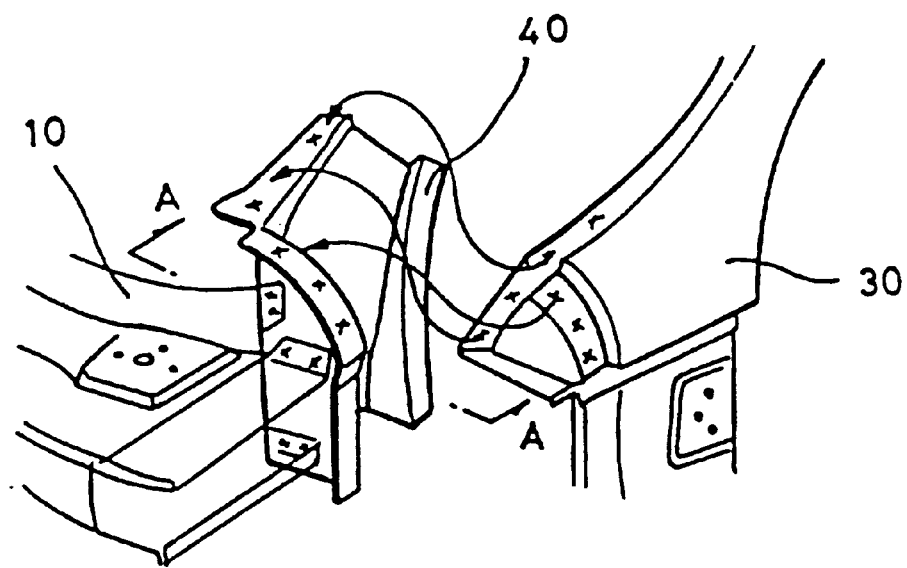
FIG. 3 is an exploded perspective view illustrating the front part of a vehicle including a front frame reinforcement structure according to the present invention.
Figure 4:
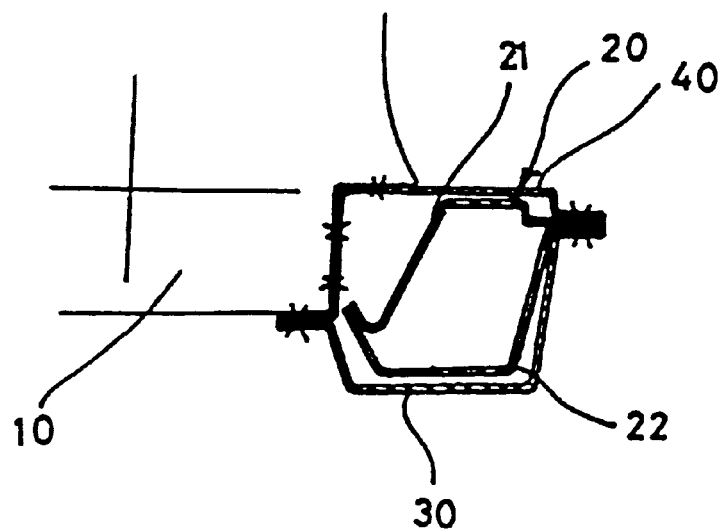
FIG. 4 is a cross-sectional view taken along the line A—A of FIG. 3.

Referring to FIG. 2, a front frame reinforcement structure of a vehicle according to an embodiment of the present invention is illustrated. In FIG. 2, respective elements corresponding to those in FIG. 1 are denoted by the same reference numerals. As shown in FIG. 2, the front frame reinforcement structure includes a front column 20 consisting of an inner panel 21 and an outer panel 22 coupled to each other in such a fashion that they form a closed cross-sectional structure. Around the front column 20, a side frame 30 and a reinforcement panel 40 are welded to each other at their facing ends to form a closed cross-sectional structure enclosing the front column 20. The side frame 30 and reinforcement panel 40 are welded at respective one-side ends thereof to a corresponding end of the front column 20. A dash panel 10 is welded at one end thereof to the other-side ends of the side frame 30 and reinforcement panel 40.

In this front frame reinforcement structure according to the present invention, when impact is applied to an engine hood (not shown) of the vehicle due to a front collision accident generated during a running of the vehicle, its impact energy is primarily absorbed by the dash panel 10, and then secondarily absorbed by the closed structure defined by the side frame 30 and reinforcement panel 40, and then thirdly absorbed by the closed structure of the front column 20 consisting of the inner and outer panels 21 and 22 welded together. Thus, the impact energy is completely and widely distributed.

As apparent from the above description, the present invention provides a front frame reinforcement structure of a vehicle which provides an enhancement in the bending and torsion rigidity of a vehicle body, thereby being capable of suppressing an injure of occupants when impact is applied to the front part of the vehicle due to a collision accident.

What is claimed is:

1. A front frame reinforcement structure of a vehicle comprising:

a front column including an inner panel and an outer panel coupled to each other to form a closed structure;

a side frame welded at one end thereof to one end of the front column;

a reinforcement panel welded at one end thereof to the one end of the front column, the reinforcement panel being welded at the other end thereof to the other end of the side frame so that it defines a closed structure enclosing the front column, together with the side frame; and a dash panel welded at one end thereof to the other end of the reinforcement panel.

* * * * *